United States Patent [19]

Senderoff et al.

[11] 3,963,518

[45] June 15, 1976

[54] SOLIDS IONICALLY CONDUCTIVE AT ELEVATED TEMPERATURES

[75] Inventors: Seymour Senderoff, Fairview Park; Geoffrey W. Mellors, Strongsville, both of Ohio

[73] Assignee: Union Carbide Corporation, New York, N.Y.

[22] Filed: July 16, 1970

[21] Appl. No.: 55,584

[52] U.S. Cl. .............................. 136/83 T; 136/153
[51] Int. Cl.² .......................................... H01M 4/36
[58] Field of Search ................. 136/153, 83; 23/367

[56] References Cited
UNITED STATES PATENTS 3,440,101   4/1969   Grafstein ........................... 136/153
3,582,291   6/1971   Mellors ............................. 136/153

OTHER PUBLICATIONS

Bradley et al, High Ionic Conductivity Solids, Trans. Far. Soc., 63, 1967 pp. 424–430.

Foley, Solid Electrolyte Galvanic Cells, Journal of the Electrochemical Society, pp. 13C–22C, Jan. 1969.

*Primary Examiner*—Donald L. Walton
*Attorney, Agent, or Firm*—Cornelius F. O'Brien

[57] ABSTRACT

Binary compositions of copper iodide and an alkali metal iodide or cyanide become good ionic conductors at temperatures above about 250°C. and are useful as electrolyte in electrochemical devices for use at such temperatures.

3 Claims, No Drawings

SOLIDS IONICALLY CONDUCTIVE AT ELEVATED TEMPERATURES

This invention relates to solid ionically conductive materials and refers more particularly to materials which while having vanishingly small ionic conductances at ordinary room temperatures become good ionic conductors at elevated temperatures.

The theoretical adavntages of electrochemical devices such as batteries which are free of liquid have been discussed in the art for many years. The principal difficulty which has limited actual development of such devices is that few materials have been found which have adequate ionic conductivity to serve as electrolytes in such devices. For instance, although it has been known for some time that silver iodide is ionically conductive at room temperature its specific conductance is so low that batteries using it as electrolyte are capable of supporting only minute current drains. More recently complex compositions of silver iodide and other compounds such as potassium iodide or potassium cyanide have been found to have markedly higher ionic conductivity than silver iodide and the use of such compositions as solid battery electrolytes makes possible the production of batteries capable of delivering useful power.

The present invention is based upon the discovery that certain complex copper containing compositions while very poor ionic conductors at ordinary room temperatures undergo a sharp transition at elevated temperatures to become good ionic conductors at such temperatures. This sharp change in conductivity results from a sudden phase change in the material at a specific temperature and is fundamentally different and more useful for most applications than the gradual increase in conductivity with increasing temperature that characterize the usual type of solid ionic conductor. The invention comprises binary compositions of copper iodide and an alkali metal iodide or cyanide, the molar proportion of copper iodide with respect to the alkali metal iodide or cyanide being about 4 to 1. Alkali metals that may be used include potassium, rubidium and cesium, potassium being preferred.

Specific examples of compositions of the invention include: $4CuI - KI$ and $4CuI - KCN$. The former compound changes from poor ionic conductor to good ionic conductor at about 250°C. The latter shows this transition at about 270°C. Both materials retain good ionic conductivity up to and beyond their melting points, these being about 450°C. for both. The materials are compounds which may be represented by the formulas $KCu_4I_5$ and $KCu_4I_4CN$. Both have a specific conductance at 300°C. of above 0.2 ohm$^{-1}$ cm$^{-1}$.

The materials of the invention may be prepared without difficulty simply by melting appropriate starting materials, e.g. CuI and KI, in a sealed vessel under a protective inert atmosphere for example of argon or helium. After melting and thorough mixing, the resultant molten mass is rapidly quenched to room temperature. The resulting solid may be crushed and pelleted according to ordinary techniques, care being taken to avoid moisture pickup.

Samples prepared as just described were tested for specific conductances using a standard 1000 cycle conductance bridge and have been shown to have specific conductance of above 0.2 ohm$^{-1}$ cm$^{-1}$ as indicated above. The specific conductance of $4CuI - KCN$ at room temperature, on the other hand is about $1 \times 10^{-7}$ ohm$^{-1}$ cm$^{-1}$ and that of $4CuI - KI$ is substantially greater than $1 \times 10^{-3}$ at room temperature. The composition of $4CuI - RbI$, another specific example of the invention, is not an ionic conductor at room temeperature but about 252°C. has a specific conductance of about $2.3 \times 10^{-3}$ ohm$^{-1}$ cm$^{-1}$. The specific conductance of this material at 343°C. was determined to be $1.7 \times 10^{-1}$ ohm$^{-1}$ cm$^{-1}$.

The data indicate the suitability of the material of the invention to serve as electrolytes in devices activatable at temperatures in the range above 250°C. up to 350°to 400°C. or thereabouts. Examples of such devices include thermal batteries for fuses or missiles, warning devices activatable at elevated temperatures, and devices adapted to perform certain functions when the ambient atmosphere in which such device is placed reaches a specific and predetermined elevated temperature.

The compositions of the invention are suited for use in batteries using copper as anodes and preferably iodine containing cathodes. Specific examples of useful iodine containing cathode materials are iodine-cyanide materials prepared by the reaction of elemental iodine and metal cyanides at elevated temperatures in a sealed vessel and the absence of water described in U.S. patent application Ser. No. 55,623 filed July 16, 1971 now U.S. Pat. No. 3,689,323 assigned to the assignee of this invention. Other cathode materials which may be used are those listed in U.S. Pat. No. 2,894,053.

What is claimed is:

1. A binary composition of copper iodide and an alkali metal cyanide suitable for use in electrochemical devices activatable at temperatures above about 250°C. which composition is ionically conductive in the solid state above such temperature.

2. A composition as defined by claim 1 represented by the formula $4CuI-KCN$.

3. An electrochemical device activatable at temperatures above about 250°C. and containing as electrolyte a composition represented by the formula $4CuI-KCN$ which composition is ionically conductive in the solid state at temperatures above about 250°C.

* * * * *